US010160078B2

(12) United States Patent
Podiebrad et al.

(10) Patent No.: US 10,160,078 B2
(45) Date of Patent: Dec. 25, 2018

(54) POSITIONING DEVICE, IN PARTICULAR TOOL POSITIONING DEVICE, FOR A PROCESSING CENTER, AND PROCESSING CENTER WITH SAME

(71) Applicant: F. ZIMMERMANN GMBH, Neuhausen (DE)

(72) Inventors: Christian Podiebrad, Weingarten (DE); Daniel Demlang, Engstingen (DE)

(73) Assignee: F. Zimmermann GMBH, Neuhausen (DE)

( * ) Notice: Subject to any disclaimer, the term of this patent is extended or adjusted under 35 U.S.C. 154(b) by 0 days.

(21) Appl. No.: 15/479,579

(22) Filed: Apr. 5, 2017

(65) Prior Publication Data
US 2017/0297155 A1 Oct. 19, 2017

(30) Foreign Application Priority Data

Apr. 14, 2016 (DE) .......................... 10 2016 106 936

(51) Int. Cl.
*B23Q 1/62* (2006.01)
*B23Q 3/18* (2006.01)
(Continued)

(52) U.S. Cl.
CPC ................. *B23Q 3/18* (2013.01); *B23C 5/26* (2013.01); *B23Q 1/017* (2013.01); *B23Q 1/621* (2013.01);
(Continued)

(58) Field of Classification Search
CPC .......... Y10T 409/309576; B23Q 1/017; B23Q 1/621; B23Q 1/62; B23Q 1/626; B23Q 1/628
See application file for complete search history.

(56) References Cited

U.S. PATENT DOCUMENTS 3,359,861 A * 12/1967 Johnson ................... B23Q 1/54
409/211
3,484,065 A * 12/1969 Walter ............... B23Q 11/0014
248/180.1
(Continued)

FOREIGN PATENT DOCUMENTS

DE 100 58 627 A1 6/2002
DE 102 59 215 A1 7/2004
(Continued)

OTHER PUBLICATIONS

The German Office Action for the Corresponding German application No. 10 2016 106 936.1 in the German language, dated Dec. 4, 2017 (5 pages).

*Primary Examiner* — Daniel Howell
(74) *Attorney, Agent, or Firm* — R. S. Lombard

(57) ABSTRACT

A positioning device, in particular a tool positioning device, for a processing center that comprises a compound slide with a first slide movable in a longitudinal direction of the processing center and a second slide that can be moved in a transverse direction relative to the first slide. The first and the second slides have a matching offset configuration of the sides opposite each other, that bear guides and guide elements that interact with each other in order to guide the second slide in the transverse direction. These guides and guide elements are in part arranged at different heights in a vertical direction in such a manner that the second slide is guided on the first slide on at least two spaced apart guiding points, wherein the guiding distance between the guiding points varies during a traversing motion of the second slide relative to the first slide in the transverse direction.

17 Claims, 6 Drawing Sheets

(51) Int. Cl.
  *B23C 5/26*   (2006.01)
  *B23Q 1/01*   (2006.01)
(52) U.S. Cl.
  CPC ...... *B23C 2240/00* (2013.01); *B23C 2260/04*
        (2013.01); *Y10T 409/309576* (2015.01)

(56) References Cited

U.S. PATENT DOCUMENTS

| | | | |
|---|---|---|---|
| 4,632,615 A | 12/1986 | Yamamura | |
| 4,792,267 A * | 12/1988 | Warner | B23Q 1/017 384/42 |
| 6,314,847 B1 * | 11/2001 | Nakaminami | B23Q 1/015 82/117 |
| 7,506,423 B2 * | 3/2009 | Iwabuchi | B23B 3/065 29/27 C |
| 8,714,535 B2 * | 5/2014 | Jung | B23Q 1/017 269/57 |
| 2013/0255454 A1 * | 10/2013 | Yamamoto | B23Q 1/5406 82/146 |
| 2016/0339552 A1 * | 11/2016 | Huang | B23Q 1/017 |

FOREIGN PATENT DOCUMENTS

| | | | | |
|---|---|---|---|---|
| EP | 0 152 081 A2 | | 8/1917 | |
| EP | 0 517 168 B1 | | 4/1998 | |
| EP | 2 666 566 B1 | | 5/2014 | |
| JP | 10043975 A | * | 2/1998 | |
| JP | 2000061755 A | * | 2/2000 | |
| JP | 2002321128 A | * | 11/2002 | |
| WO | WO 2012099323 A2 | * | 7/2012 | ............. B23B 3/065 |

\* cited by examiner

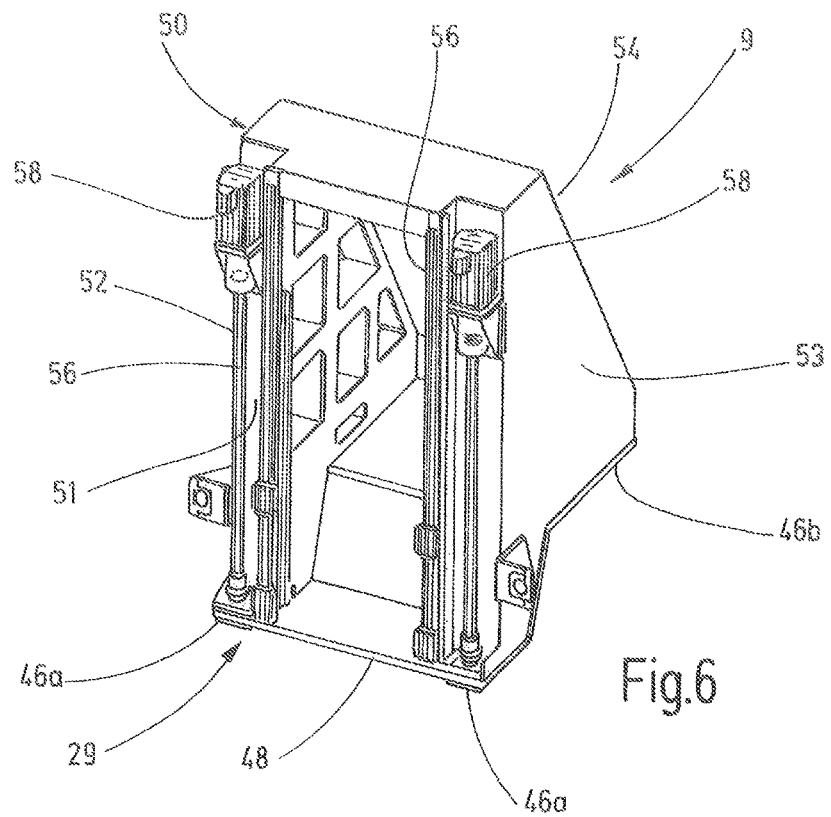
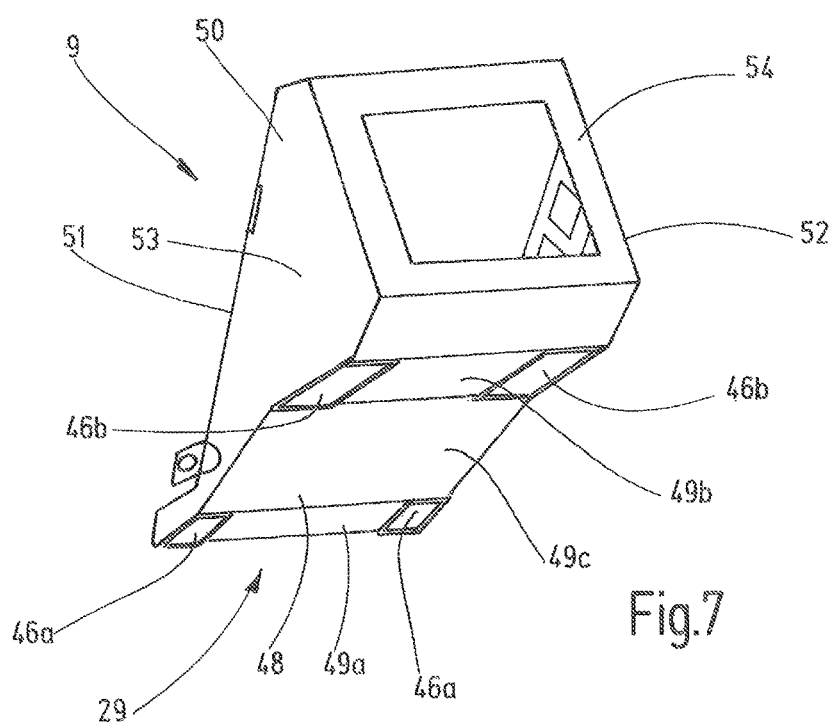

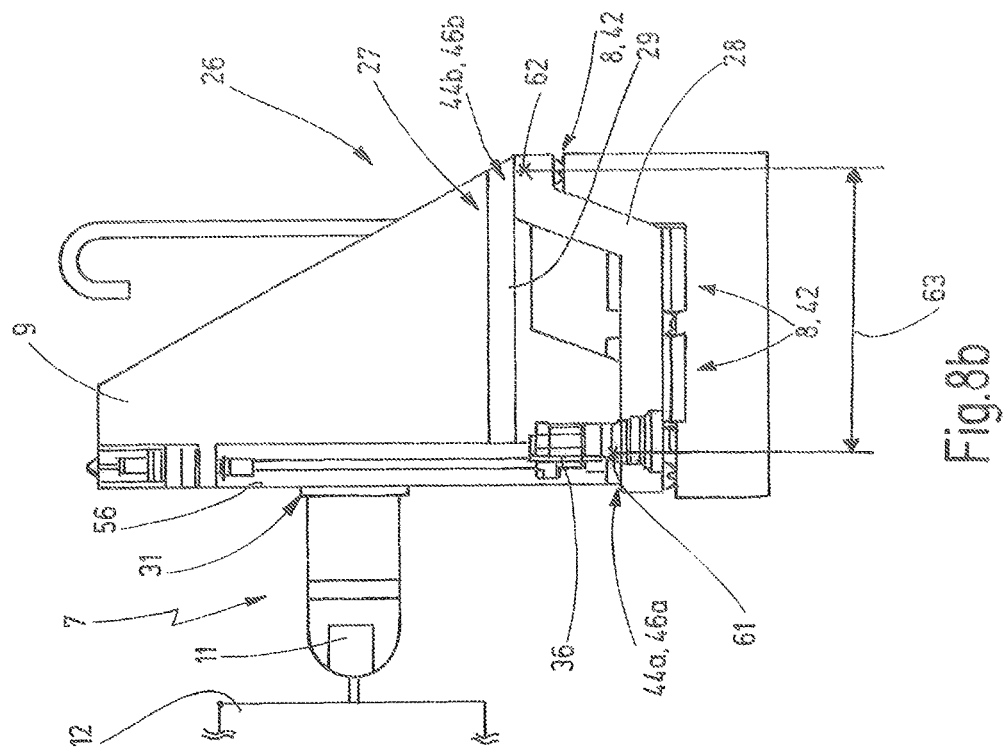
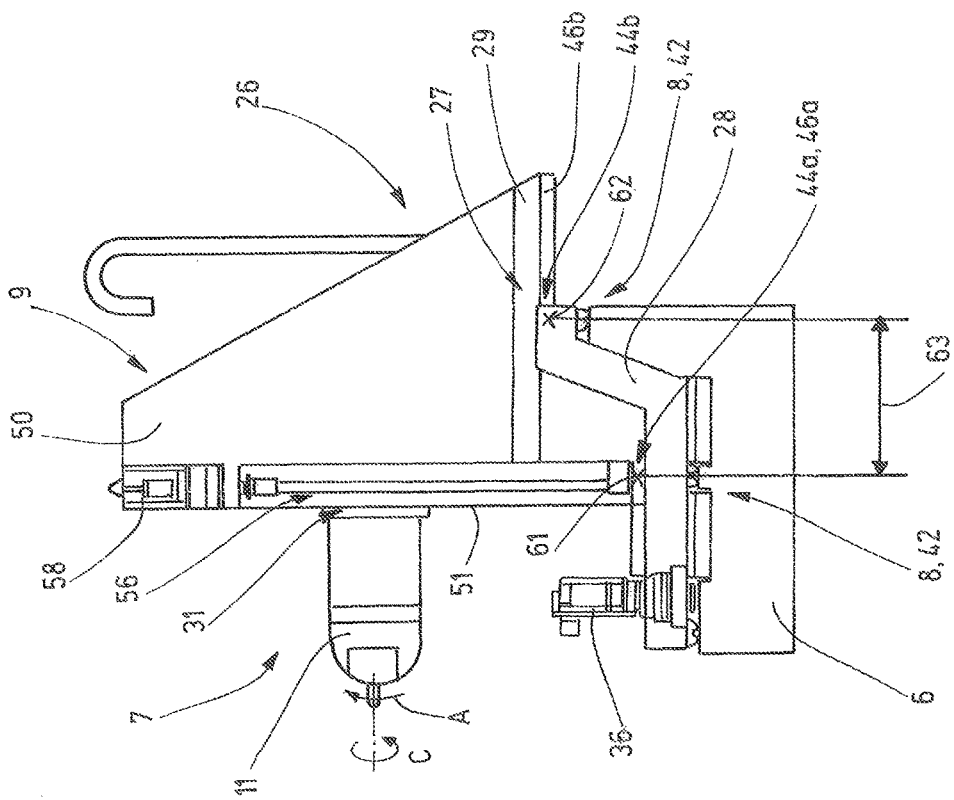

POSITIONING DEVICE, IN PARTICULAR TOOL POSITIONING DEVICE, FOR A PROCESSING CENTER, AND PROCESSING CENTER WITH SAME

CROSS-REFERENCE TO RELATED APPLICATION

This application claims the priority benefits of German Application No. 10 2016 106 936.1 filed Apr. 14, 2016. The said German Application No. 10 2016 106 936.1 is incorporated herein by reference as though fully set forth.

BACKGROUND OF THE INVENTION

The present invention relates to a positioning device, in particular a tool positioning device, for a processing center, in particular a horizontal processing center, and a processing center with such a positioning device.

Machine tools, for example, for subjecting workpieces having various configurations to a chip removing process, ranging from small table machines to large processing centers for processing large parts have been known. In particular when large parts are being processed, for example in tool, mold and model making, or during production in the automobile and aerospace industries and in comparable applications, it is necessary to produce complex surfaces displaying the highest surface quality on large workpieces and at high processing rates. To do so, usually high-precision guides are used, in particular linear guides, on which slides can be moved in various directions for precisely positioning a workpiece and/or a processing unit, e.g., a milling head, in the processing space. In general, the guides comprise guide elements provided on the slide such as, for example, guide shoes or rail runner elements that are guided on the guide rails supported by rolling bodies. The slides may be associated with linear drives in order to be able to move them in a motor-driven manner.

Horizontal processing machines or centers, wherein a processing spindle, e.g., a milling spindle, held in a horizontal position on a carrier, can be moved in a work space and fixed in position in any pivot position, while a workpiece, e.g., on a workpiece palette is loaded in a horizontal position and transferred into a vertical processing position, have been known. For maximum flexibility, the processing spindle can be guided and positioned in a first horizontal direction, in particular the longitudinal direction of a processing machine or a processing center, a second horizontal direction, in particular a transverse direction for a delivery and resetting movement of the processing spindle relative to the workpiece, and be movably guided and positioned in a first vertical direction. In doing so, maintaining the greatest possible flexibility with respect to positioning in a large processing space and the simultaneous, simple, compact and cost-effective construction of the machine or the processing center should provide a guide that is stiff, stable and precise.

From EP 2 666 566 B1 there is known a turning machine that comprises a workpiece spindle unit that is movably arranged on a machine bed. The tool spindle unit comprises a longitudinal slide that can be moved in longitudinal direction on the machine bed in linear guides. On the longitudinal slide, there is provided a cross slide such that it can be guided in transverse guides. On the cross slide, there is provided a vertical slide such that it can be moved in vertical guides. In particular, the machine bed has an offset configuration, wherein a first and a second guide rail of the longitudinal guides are arranged parallel to each other at different heights or horizontal planes of the machine bed. As a result of this, a constant, enlarged guiding distance between the longitudinal guide rails can be maintained with a reduced footprint of the machine bed. The longitudinal slide, in turn, carries on its upper side two parallel guide rails that extend on a common horizontal plane in transverse direction in order to guide the cross slide. The cross slide, in turn, comprises the vertical guides for the vertical slide. The vertical slide supports the spindle unit for processing a workpiece that thus can be freely positioned within a limited region of the work space in the vertical directions relative to each other.

Similar machine tools have also been known from DE 102 59 215 A1 and DE 100 58 627 A1.

Considering this, it is an object of the present invention to provide a positioning device for a workpiece or a tool, and a processing center with such a positioning device that allow great accuracy and flexibility in view of positioning in a largest possible processing space, while allowing, at the same time, a simple, compact and cost-effective, but stiff, construction. In particular, stiff, stable and precise guiding is to be provided, wherein the footprint is reduced, as possible, and the moved dimensions are small, as possible.

SUMMARY OF THE INVENTION

This object is achieved by the positioning device according to the invention, in particular a tool positioning device, for a processing center having the features of claim 1 and the inventive processing center for processing workpieces according to claim 11.

According to a first aspect of the invention, there is provided a positioning device, in particular a tool positioning device, for a processing center comprising a first slide and a second slide interacting with the latter. The first slide bears first guide elements that are disposed for the operative connection with the first guides in order to movably guide the first slide during operation in a horizontal direction. Furthermore, the second slide bears second guides that, during operation, extend in a second horizontal direction transverse to the first horizontal direction. The second slide has second guide elements for the operative connection with the two guides of the first slide in order to movably guide, during operation, the second slide in the second horizontal direction on the first slide. Each of the second guide elements and the second guides, respectively, are in part arranged at different heights in a vertical direction that extends perpendicularly to the first and the second horizontal directions in such a manner that the second slide is guided on the first slide on at least two guiding points that are separate from each other, the distance of said guiding points varying during a movement of the second slide relative to the first slide.

In the positioning device according to the invention, the second slide is supported and guided in guides during operation on the first slide, said guides being arranged in portions at different heights and on different planes in such a manner that the distance between the guides changes relative to the first slide when the second slide is being moved. In particular, the first guide elements and the first guides of the first slide can guide, for example, the first slide in longitudinal direction of a processing center, while the second guide elements and the second guides may be used for a guidance in transverse direction in order to deliver, for example, a processing unit of the processing centre in the direction toward a workpiece, or to move it away therefrom. Due to the inventive construction of the second guide elements and the second guides it can be achieved that the guiding distance is enlarged during a delivery movement, so that increasingly wider and stiffer, stable and highly precise guiding is achieved, in particular in the processing position. A relatively large guiding and working region can be achieved with a reduced footprint, for example of a machine bed or machine frame of the processing center. A larger guiding distance in the processing position also benefits the stiffness of the machine during the processing operation and the quality of the processing result.

In so far as guides and guide elements are mentioned here, the guide elements are intended to refer only to counter guides that interact with the guides. These are always linear guides that, for example, are represented by guide rails and associate rail runner elements that, preferably, are guided by tubular bodies on the guide rails. In principle, guide shoes in the form of sliding bodies could also be guided in a sliding manner in the guide rails. Even if it is stated that the guides comprise guide rails and the guide elements comprise runner elements or guide shoes, this shall not imply a specific design or dimension of the rails and runner elements. In particular, the guide rails may be shorter or longer than the runner elements or the guide shoes. The guide rails can accommodate the runner elements or guide shoes or be accommodated by them. Unless stated otherwise, the terms guides and guide elements or rails and rail runner elements/guide shoes are interchangeable.

In a preferred embodiment, the first and the second slide form a compound slide with which a workpiece and/or tool can be moved driven by a motor in the first and the second horizontal directions relative to each other in vertical orientation. The first horizontal direction may characterize the longitudinal direction of a machine or a processing center, while the second horizontal direction may characterize the transverse direction that may correspond to the delivery and resetting direction. To this extent, reference may be made here to the first slide as the longitudinal side and to the second slide as the cross slide.

Preferably, the first slide comprises an offset upper side that has a first horizontal plane during operation and a second horizontal plane during operation, which during operation is located in the vertical height direction above the first horizontal plane. The horizontal planes are disposed for the accommodation of the second guides.

In particular the second guides may comprise at least one first pair of parallel rails, i.e., at least two or also three or more guide rails parallel to each other, said guide rails extending in the first horizontal plane. Furthermore, the second guides may comprise at least one additional pair of guide rails, i.e., at least two, optionally also three or more parallel guide rails, that extend in the second horizontal plane. The second pair of guide rails may be oriented in the second horizontal direction, superimposed or not superimposed with the first pair of guide rails. In any event, the pairs of guide rails extending in different horizontal planes allow the variation of the guiding distance during a movement of the second slide relative to the first slide.

In one embodiment, the offset upper side of the first slide furthermore has an oblique plane located between the first horizontal plane and the second horizontal plane, connecting said planes to each other, wherein the oblique plane extends in an oblique manner relative to the first and the second horizontal directions and to the vertical direction. Despite the compact design, high torsional stiffness of the positioning device can be achieved with enlarged guiding distance and reduced footprint.

In any above-mentioned embodiment of the positioning device, in which the first slide may comprise an offset upper side, the second slide may also have an offset underside that preferably is configured to match the offset upper side of the first slide. In particular, the underside of the second slide may have a first horizontal surface associated with the first horizontal plane of the first slide and comprise a second horizontal surface associated with the second horizontal plane of the first slide. The first horizontal surface may accommodate at least one first pair of rail runner elements, i.e., at least two or more spaced apart rail runner elements, of the second guide elements that are arranged and disposed for the operative connection with the first pair of guide rails of the first slide. The second horizontal surface preferably has at least one additional pair of rail runner elements, i.e., at least two or three or more spaced-part rail runner elements, of the second guide elements that are arranged and disposed for the operative connection with the further pair of guide rails of the first slide. Furthermore, a central oblique surface connecting the two horizontal surfaces—corresponding to the oblique surface of the upper side of the first slide—may be provided on the underside of the second slide.

In particular, the rail runner elements on the first or the second surface of the second slide and the guide rails on the first and second horizontal planes of the first slide are arranged and oriented distributed in such a manner that, during operation, a guiding distance between a first guiding point, in which the first pair of rail runner elements is in engagement with the first pair of guide rails, and a second guiding point, in which the additional pair of rail runner elements is in engagement with the additional pair of guide rails, varies, while the second slide is moved relative to the first slide in the second horizontal direction. In particular, it can be advantageously accomplished that the guiding distance is increasingly enlarged during a delivery movement of a tool and a workpiece relative to the other in order to obtain a maximum guiding distance in the processing position.

In order to achieve this, it is possible, in one embodiment, for the first plane and the guide rails provided thereon to have a larger dimension in the second horizontal direction than the second plane and the guide rails provided thereon, while the first surface and the rail runner elements provided thereon may have a smaller dimension in the second horizontal direction than the second surface and the rail runner elements provided thereon. Then, during a delivery movement, it is possible to increasingly enlarge the guiding distance and the stiffness and the guiding stability.

In some embodiments the first slide may further have an offset underside that has planes parallel to the planes of the upper side. Then, the underside is configured preferably matching a correspondingly offset upper side or bearing surface of a machine frame or machine bed, that supports the first guides. Such a design of the first slide reduces its weight and thus the moved mass during a guided movement of the first slide, which results in a savings of driving energy and in a reduction of wear during operation.

In a preferred embodiment, the positioning device of any type mentioned hereinabove is used for positioning a processing unit in a processing center, in particular a horizontal processing center, wherein the second slide supports a carrier for a processing unit such as, for example, a milling unit or the like. The second slide may also be an integral part of such a carrier. The carrier may further comprise a vertical guide for vertically moving the processing unit. The processing unit may comprise any desired processing spindle for the accommodation of a tool such as, for example, a grinding, drilling or erosion tool, a laser head, a milling head, etc.

According to a further aspect of the invention, a processing center for processing workpieces, in particular large parts in tool making, mold making and model making or for production in the automobile industry or aircraft industry, is provided. The processing center comprises a processing station that bears a processing unit for processing a workpiece, and a positioning device as described hereinabove, said positioning device being disposed for positioning the workpiece and the processing unit relative to each other. The first and the second slide are associated with driving devices for moving said slides driven by a motor in the first and second horizontal directions, respectively, along the first and the second guides, respectively. The positioning device may be in any of the embodiments and have any features explained hereinabove, wherein the advantages of the positioning device, in particular the highly precise and highly flexible positioning, stiff, stable and exact guiding, simple, compact and cost-effective and yet stiff construction, a small footprint and reduced moved mass, also benefit the processing center as a whole.

In a preferred application, the processing center is a horizontal processing center, wherein the processing unit is held in a substantially horizontal position on a carrier and wherein workpieces are loaded on a workpiece palette in horizontal position and can be processed in vertical position. The processing center may further comprise a setup station for mounting workpieces on a workpiece palette and/or a buffer station for the temporary intermediate storage of a workpiece palette with the workpiece mounted thereon, as well as workpiece positioning means that are disposed for transferring a workpiece palette with the workpiece during a transport between anyone the setup station, the buffer station and the processing station and another one of the stations out of a horizontal position into a vertical position or vice versa. Furthermore, the processing center comprises the positioning device that may then be disposed for positioning the processing unit relative to the workpiece.

Preferably, the processing unit comprises a processing spindle, in particular a milling spindle; and the processing spindle may comprise additional, rotating, pivoting and/or processing axles. It is also possible to use other processing units such as, for example, grinding, erosion or drilling units, laser heads and other processing units.

Preferably, the processing center comprises a machine frame or machine bed having a longitudinal extension defining a longitudinal direction that extends parallel to the first horizontal direction or corresponds thereto. The first slide of the positioning device may be movably supported and guided on the machine bed. In particular, the first slide may be movably supported and guided at a constant guiding distance on the first guide. It is possible to provide a long path of movement in the longitudinal direction—of up to 30 meters or even more—by providing several serially connected modules of the machine bed with the first guides. The machine bed or machine frame may be an elongated body with a base side that is provided for the installation at an installation site in a processing space, or it may also be integrated with the installation site of the processing space.

In one embodiment, the machine bed may have an upper bearing surface that supports the machine bed guide rails extending in longitudinal direction and forming the first guides on which the first slide is movably guided in the first horizontal direction, i.e., the longitudinal direction. For example, the second slide may be movable on the first slide in the second horizontal direction or transverse direction toward a workpiece present in a processing position, or away from said workpiece. The first slide may also be referred to as the longitudinal slide, while the second slide may be referred to as the cross slide. As has already been mentioned, the guiding distance during a delivery movement can be advantageously increased, thus increasing guiding stability.

In some embodiments, the upper bearing surface of the machine bed may have an offset configuration with a first horizontal bearing surface section at a first vertical height, said first horizontal bearing surface section bearing at least one or more machine bed guide rails, and have a second horizontal bearing surface section on a second vertical height, said second horizontal bearing section bearing at least one more of the machine bed guide rails, wherein the first and the second horizontal bearing surface sections are connected to each other by a central surface section that extends preferably obliquely relative to a horizontal plane and a vertical plane. The bearing surface sections thus can be adapted to the course of the first or the second plane of the underside of the slide or follow said course. The first slide with the correspondingly offset underside, as well as an offset upper side, exhibit reduced mass that needs to be moved.

In preferred embodiments of the invention, the second slide is an integral part of a carrier, in particular a carrier for a processing unit, wherein the carrier may further comprise vertically oriented guides, on which a vertical slide, in particular a vertical slide bearing the processing unit, can be movably supported and guided in vertical direction driven by a motor. It is then possible to largely flexibly and accurately position the processing unit in all three Cartesian coordinates in a space.

The stiffness and guiding stability made possible by the positioning device, makes the processing center also particularly suitable for processing large parts that are subject to strict specifications regarding processing speed and processing accuracy such as are required in the automobile industry and the aircraft industry. In doing so, fast and highly dynamic traversing movements and precise positioning are possible, these making possible a high surface quality also in the processing of large parts. To give an example, it is possible, for example, to process workpieces of steel having a weight of several tons—even more than 10 tons—in a work space that may have any length—even more than 10 meters—and a width, e.g., of 2 to 4 meters, as well as a height, e.g., of 2 to 3 meters, wherein the positioning device ensures a precise positioning within this work space.

BRIEF DESCRIPTION OF THE DRAWINGS

Additional advantageous details of embodiments of the invention can be inferred from the dependent claims, the drawings and the related description. Hereinafter, the description is described in greater detail with reference to drawings that show exemplary embodiments of the invention and that are by no means restrictive, wherein the same reference signs are used in all Figures in order to identify the same elements, said drawings showing in:

FIG. 6 a perspective view, viewed obliquely from the top, of a second slide and a carrier for the processing unit that form part of the positioning device according to FIG. 3, in a simplified representation;

FIG. 7 a perspective view of the second slide and the carrier according to FIG. 6, in a greatly simplified representation, viewed obliquely from the bottom; and FIGS. 8a and 8b the positioning device according to FIGS. 3 to 7, in a side view, in different positions during a positioning process.

DETAILED DESCRIPTION OF THE INVENTION

Figure 1:
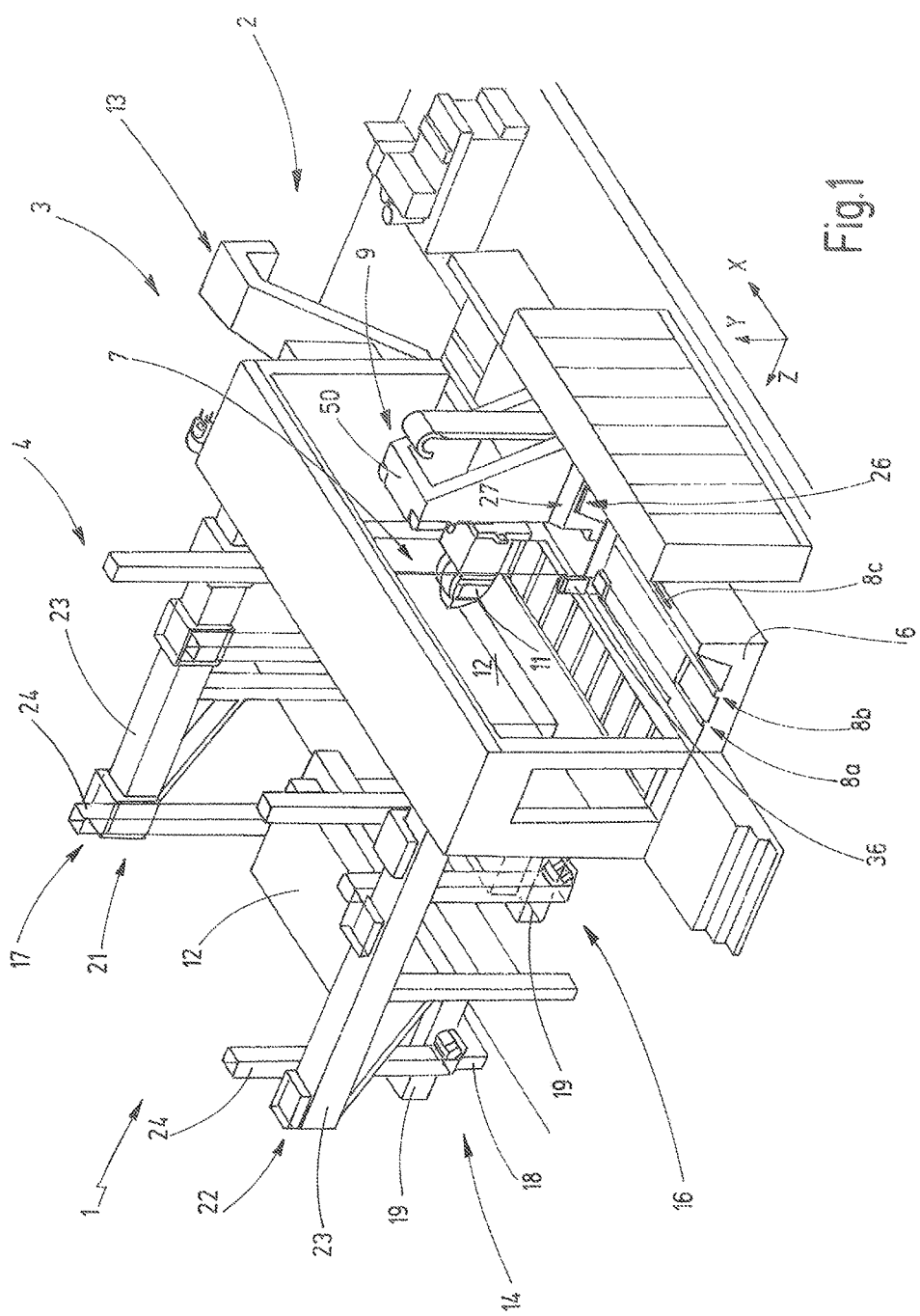
FIG. 1 a perspective view of a horizontal processing center for processing large parts, in a greatly simplified representation.

FIG. 1 shows a greatly simplified perspective representation of a horizontal processing center 1 that is suitable for processing parts, in particular large parts such as are produced or processed in tool making, mold making and model making or in the production of automobiles and aircraft. However, in principle, the invention may be used in any processing center 1 or any processing machine, in which it is required or desired to position a workpiece and a tool relative to each other in a desired position in a work space in a horizontal plane and, optionally also in a vertical direction in a precise manner.

Figure 2:
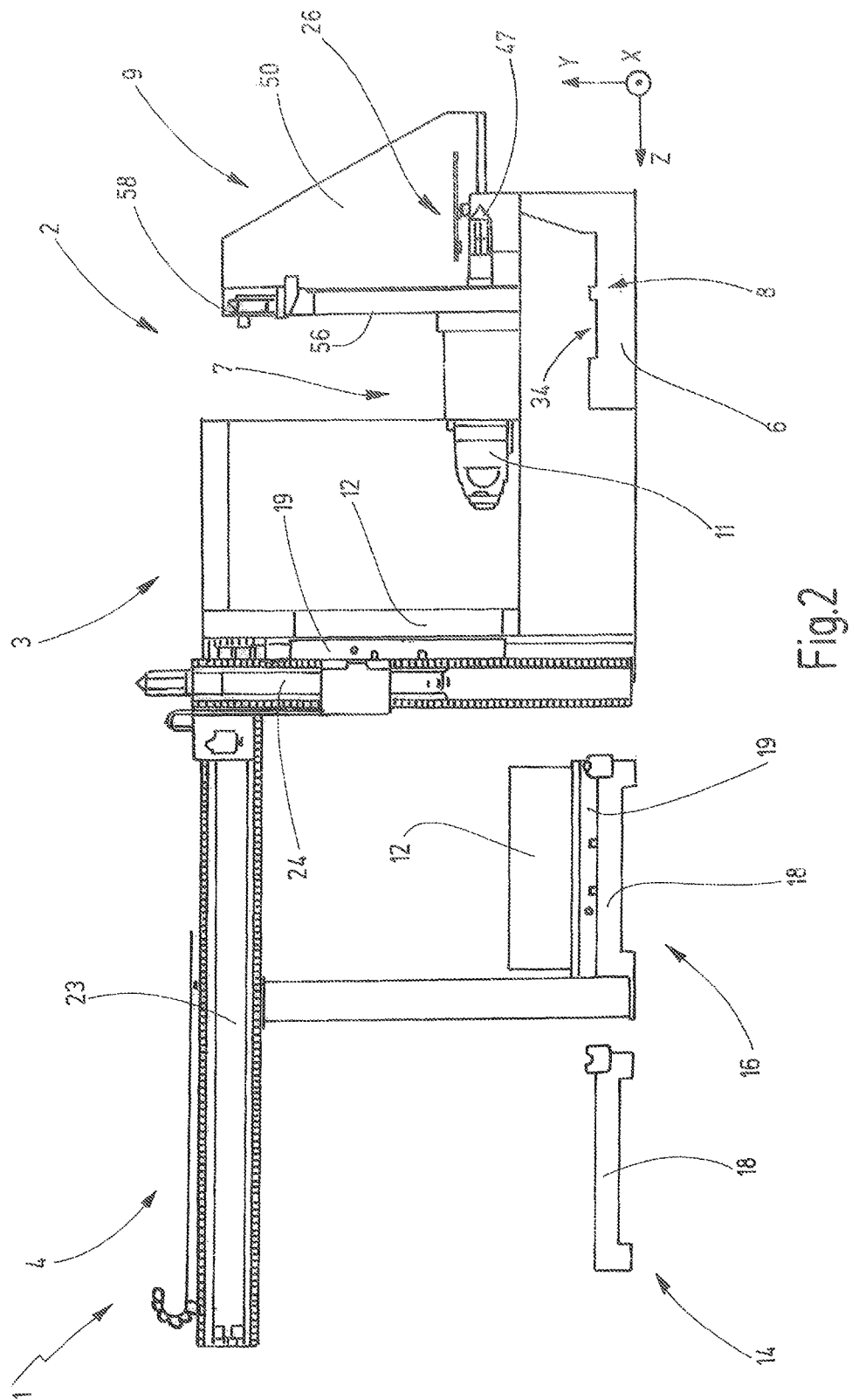
FIG. 2 a side view of the horizontal processing center according to FIG. 1, in a greatly simplified representation, omitting any components that are not essential to the invention.

As can be seen from FIG. 1 and FIG. 2 showing a side view of the processing center 1, wherein some of the components that are not essential to the invention have been omitted for illustrative purposes, the processing center 1 comprises a processing station 2, a work space 3 and a handling system 4. The processing station 2 comprises a processing unit 7 that is movably supported on a machine bed 6, said processing unit 7 potentially being, in particular, a milling unit or also a drilling unit, an erosion unit or a laser head.

The processing unit 7 can be supported and guided, as indicated in FIG. 1, on longitudinal guides 8 along the machine bed 6 in a first horizontal direction x—here the longitudinal direction of the processing center 1. The processing unit 7 comprises a carrier 9 that is movably supported linearly and guided perpendicularly to the first horizontal direction toward a work space 3, and away from said work space, in a second horizontal direction z. The carrier 9 carries a processing spindle 11, e.g., a milling spindle, that is supported and guided on the carrier 9 so as to be movable in vertical direction and is held in horizontal position. Thus, the longitudinal extension of the processing spindle 11 projects in the direction toward the work space 3 and carries, on its free end—here not specifically illustrated—a processing tool, e.g. a milling tool, for processing a workpiece 12. The processing spindle 11 may comprise further rotating, pivoting and/or processing axles such as, for example, pivot axles A, B that are orthogonal relative to each other or a longitudinal axle of the processing unit, said axle coinciding with the axis of rotation C or the processing axis, as is generally known.

As can be seen from FIGS. 1 and 2, the workpiece 12 is held in vertical position in the work space 3 in order to be processed by the processing spindle 11. Due to the vertical processing positions, chips may freely fall to the floor of the work space 3, while the workpiece 12 is being processed, and can be easily transported away by a chip conveyor 13 that is only indicated here.

In order to prepare the workpiece 12 for delivery of the workpiece 12 into the work space 3 and for removal of same from the work space 3, there is provided a handling system 4. In the exemplary embodiment of the processing center 1 illustrated here, said handling system comprises a setup station 14, a buffer station 16 and a linear axle system 17.

The setup station 14 comprises a deposit unit 18 which may consist of a deposit table or a specifically equipped deposit region of the foundation and on which a workpiece palette can be positioned that accommodates the workpiece 12 for processing. The use of a workpiece palette 19 as the carrier for the workpiece 12 for transport and during processing in the processing center 1 is of advantage—in particular, in the case of large parts with large dimensions and great weight—although not absolutely necessary in some applications.

The workpiece palette 19 may be a body having essentially the shape of a parallelepiped, however, is not restricted to a specific shape—in principle. On the upper side of the workpiece palette 19, the workpiece 12 is positioned in the setup station 14 and appropriately prepared and fixated for processing. In FIG. 1, the workpiece 12 is also represented by a body that has essentially the form of a parallelepiped, however, it may be any cubic, rotation-symmetrical or otherwise configured or to be configured workpiece.

Next to the setup station 14, there is further—but not necessarily—provided the buffer station 16 that is disposed for an intermediate storage of the workpiece 12 set up in the setup station 14 and mounted on the workpiece palette 19, before said workpiece is loaded in the work space and processed there, as well as thereafter. The buffer station 16 or several such buffer stations 16 make it possible to deliver workpieces 12 to the work space 3, to process them in said work space and to remove them therefrom, while other workpieces are set up at the same time in the setup station 14, which can contribute to a reduction of the total processing times. In the same manner as the setup station 14, the buffer station 16 may be configured with a deposit device in the form of a—here not specifically shown—deposit table or a deposit area specifically set up on the foundation.

The linear axle system 17 is provided for loading the workpiece 12 mounted on the workpiece palette 19 in the work space 3 and for removing same therefrom. This linear axle system 17 comprises a first and a second linear axle arrangement 21, 22 that are arranged parallel to each other on both sides of the setup station 14 and the buffer station 16—viewed in longitudinal direction x of the processing center 1. The first linear axle arrangement 21 and the second linear axle arrangement 22 are essentially configured so as to be identical, and each comprises at least one horizontal linear axle 23 and at least one vertical linear axle 24. Each linear axle 23, 24 represents a module that comprises a slide driven by a not specifically illustrated motor or any other driven element that can be moved along the respective horizontal or vertical axle.

The two linear axle arrangements 21, 22 are disposed to grip a workpiece palette 19 from both sides and transport it in vertical direction, as well as in horizontal, direction. Here, the linear axle arrangements 21, 22 are further disposed for pivoting the workpiece palette 19 in order to transfer it from a horizontal position on the deposit unit 17 of the setup station 14 or the buffer station 16 into a vertical position for processing in the work space 3, and vice versa. However, for this purpose, there could also be provided a separate rotating or pivoting device. In any event, in the horizontal processing center 1 shown as an example here, the workpiece palette 19 with the workpiece 12 is positioned and held in a defined processing position in the work space 3, while the processing spindle is moved by a positioning device 26 into the desired working positions in the spatial directions x, y and z, in order to process the workpiece 12 and produce complex surfaces on it.

Figure 3:
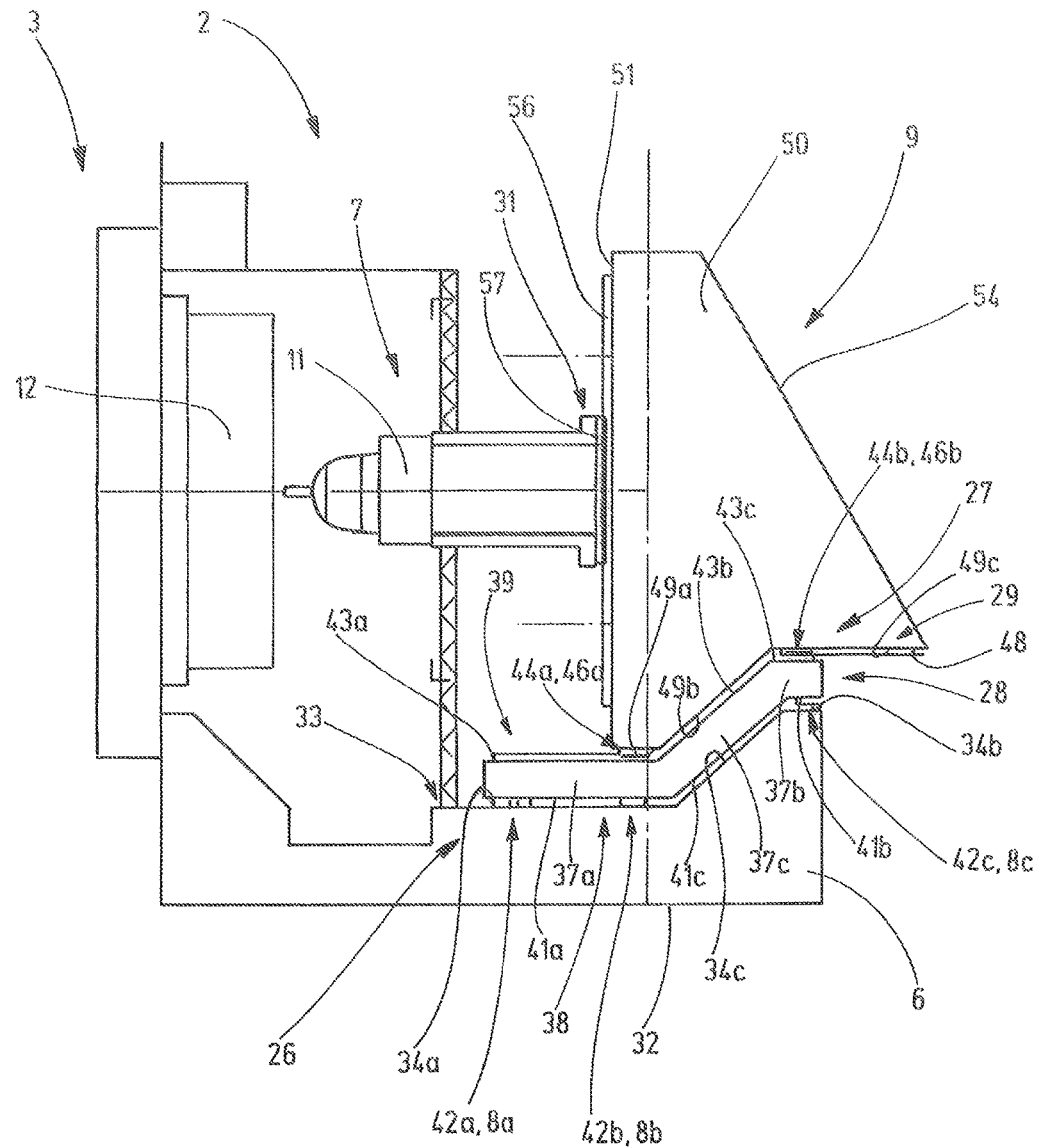
FIG. 3 a side view of a positioning device that can be used in the horizontal processing center according to FIGS. 1 and 2 for a processing unit, in a highly schematic perspective diagram.

In addition, the positioning device 26 is shown in a simplified side view in FIG. 3. The positioning device 26 comprises the machine bed or machine frame 6 with the longitudinal guides 8, a compound slide 27 provided on the machine bed 6, said compound slide being made of a first slide 28 and a second slide 29, the carrier 9, as well as a third slide 31 that is movably supported and guided on said carrier, wherein the processing spindle 11 is mounted thereto. Some of the components of the positioning device 26 are shown isolated in FIGS. 4 to 7 and will be explained in greater detail hereinafter.

Referring to FIGS. 1 to 3, the machine bed 6 has a lower base side 32 that is disposed for the installation on a floor of a space, and an upper side 33 that forms the upper bearing surface. Provided on the bearing surface 33, there are—here also referred to as the first guides—longitudinal guides 8 in the form of guide rails 8a, 8b and 8c, that extend parallel to and at a distance from each other in the longitudinal direction or the first horizontal direction x.

Here, the upper bearing surface 33 of the machine bed 6 has an offset configuration—with a first horizontal bearing surface section 34a, a second horizontal bearing surface section 34b that extends offset, and thus above the first horizontal section 34a in vertical direction y with respect to said first horizontal section, and with a center bearing surface section 34c that connects the two horizontal bearing surface sections 34a, 34b with each other and is configured as an oblique surface that extends inclined relative to the horizontal and the vertical planes. As illustrated, the width or the dimension of the first horizontal carrier surface section 34a is clearly greater in the second horizontal direction z than the corresponding width or dimension of the second horizontal section 34b.

The first horizontal bearing surface section 34a here supports two guide rails 8a, 8b of the longitudinal guides 8, while the third guide rail 8c is arranged on the second bearing surface section 24b. This results in a stiff guiding arrangement for the components supported and guided on the machine bed 6, wherein the offset configuration of the machine bed 6 and the arrangement of the first guides 8 also benefit a high torsional stiffness and stability while the workpiece 12 is being processed with the processing spindle.

Optionally, in some applications, the upper side 33 may also be a single flat horizontal surface, and only two guide elements as longitudinal guides 8 may also be sufficient, or more than three guide rails may also be provided.

The compound slide 27 is movably guided on the guide rails 8a to 8c, driven by the motor 36 indicated in FIGS. 1 and 2. As has already been mentioned, the compound slide comprises a first slide 28 that is mounted directly to the upper bearing surface 34 of the machine bed 6, and the second slide 29 that is mounted on the first slide 28 so as to be movable in the second horizontal direction z. The first slide 28 has a profile that matches the offset configuration of the upper bearing surface 34, said profile having a first horizontal section 37a, a second horizontal section 37b extending offset with respect to the first horizontal section 37a and above same in height direction y, as well as an oblique section 37c extending thereinbetween, said oblique section connecting the first and the second horizontal sections 37a, b with each other.

The first slide 28 has an underside 38 facing the upper side 33 of the machine bed 6 and an upper side 39 opposite thereto, wherein the sides 38, 39 have a corresponding offset configuration, extend parallel to each other and delimit the sections 37a to 37c. The first slide 28 having the underside 38 and the upper side 39, respectively, is additionally shown isolated in perspective views according to FIGS. 4 and 5.

The underside 38 has a first horizontal surface section 41a that extends at a minimal distance from and parallel to the first horizontal bearing surface section 34a, a second horizontal surface section 41b that extends at a minimal distance from and parallel to the second horizontal bearing surface section 34a, and has, in between, a central oblique surface section 41c that connects the surface sections 41, 41b with each other, said oblique surface section extending at a minimal distance from and parallel to the oblique bearing surface section 34c.

The first horizontal surface section 41a of the underside 38 of the first slide 28 comprises, in this case, two guide elements 42a, 42b that are configured here as elongated rail runner elements and are referred to as the first guide elements that interact with the first guides 8—stated more precisely, the guide rails 8a, 8b—for guiding the first slide 28. Provided on the second horizontal surface section 41b there is an additional first guide element 42c that is configured as an elongated running rail element (cf. FIG. 5) and that interacts with the guide rail 8c.

It should be noted that the first guide elements 42a to 42c are illustrated here as elongated runner elements only as examples that come into engagement with the guide rails 8a to 8c. The rail runner elements 42a to 42c, as well as other rail runner elements explained hereinafter, may be guided on the guide rails by not specifically shown rolling bodies, e.g., spheres, that roll between the running tracks on the first slide 28, on the one hand, and on the guide rails 8a to 8c, on the other hand, in a low-friction manner. Furthermore, it should be noted that here, as well as hereinafter, the guide elements or rail runner elements are to be understood to mean, in general, counter guides for the respective guides and guide rails, so that the guides and the guide elements are generally interchangeable. In principle, e.g., smaller machine tools can also use sliding guides.

Returning to FIGS. 3 to 5, the upper side 39 has—corresponding to a first horizontal plane 43a—a second horizontal plane 43b that is offset in vertical y-direction relative to the first horizontal plane 43a and is arranged above said first horizontal plane, as well as a middle plane 43c extending in between and connecting the first and the second horizontal planes 43a, 43b. Said middle plane is configured as an oblique plane that extends inclined with respect to a horizontal plane and a vertical plane. The width of the first and the second horizontal planes 43a, 43b essentially corresponds to the horizontal surface sections 41a, 41b on the underside 38 of the first slide 28. To this extent, the first horizontal plane 43a is clearly dimensioned wider than the second horizontal plane 43b.

Figure 4:
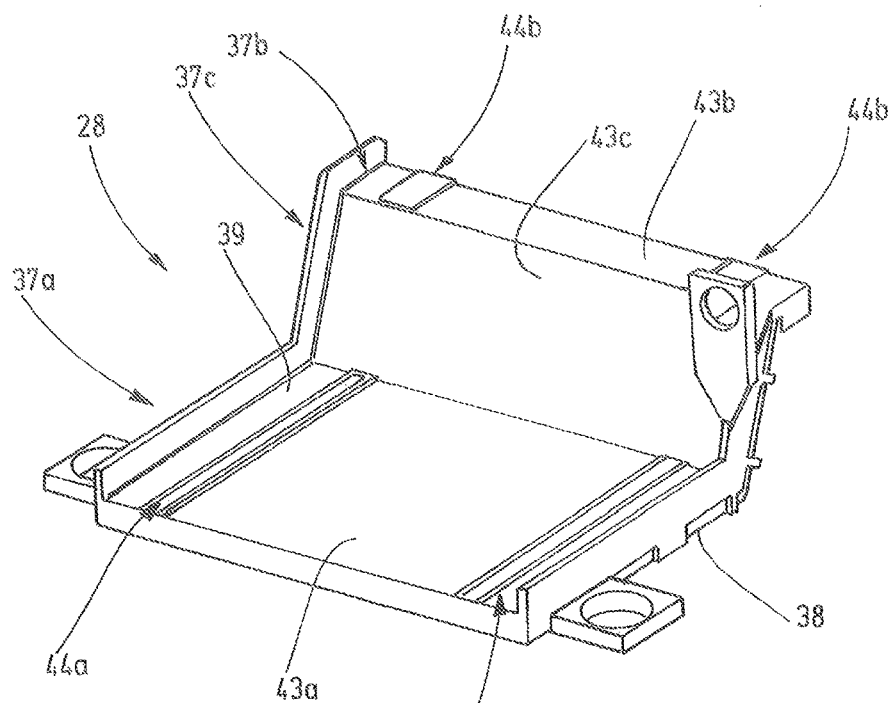
FIG. 4 a perspective view, viewed obliquely from the top, of a first slide that is part of the positioning device according to FIG. 3, in a simplified representation.
Figure 5:
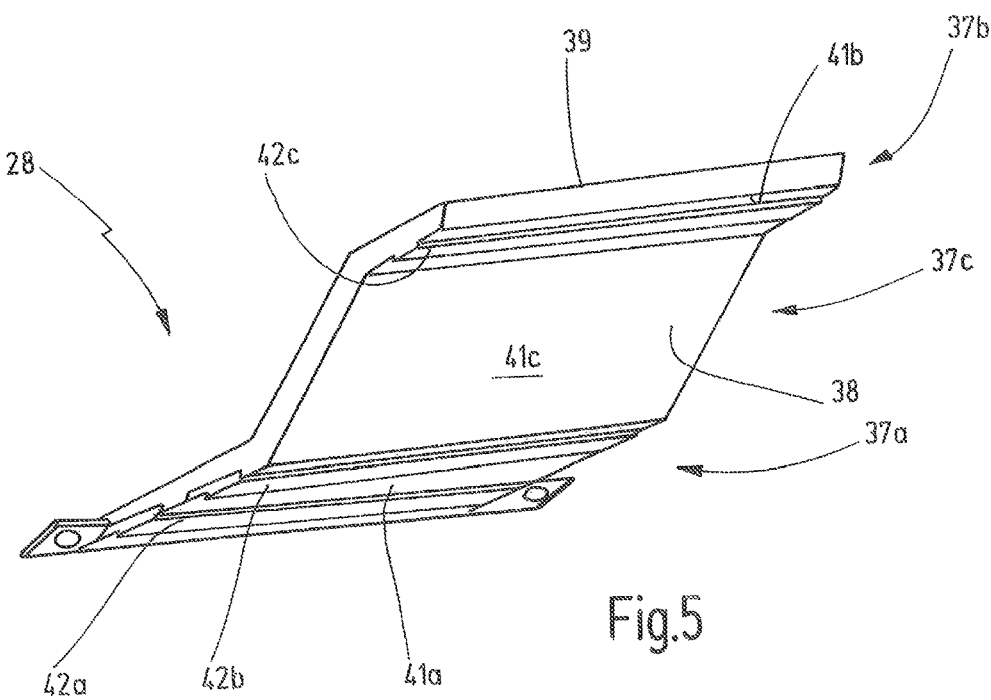
FIG. 5 a perspective view of the first slide according to FIG. 4, in a greatly simplified representation, viewed obliquely from the bottom.

As seen in particular in FIG. 4, the upper side 29 has two guides 44 that are associated with a first pair of guide rails 44a and a second pair of guide rails 44b. The guide rails 44a extend at a distance from and parallel to each other in the second horizontal direction z across the entire width of the first horizontal surface section 43a. The two guide rails 44b of the second pair of guide rails also extend in the second horizontal direction Z across the entire width of the second horizontal surface section 43b of the upper side 39. The second pair of guide rails 44b is arranged here in extension of the first guide rail pair 44a or, in other words, aligned therewith in such a manner that the guide rail pairs 44a, 44b are arranged superimposed in vertical direction, which is advantageous, but not absolutely necessary.

Referring to FIGS. 4, 6 and 7, guide elements 46 of the second slide or cross slide 29 can be moved in the second guides 44 in a second horizontal direction or transverse direction z by means of a motor 47 indicated in FIG. 2. The guide elements 46 that are referred to here as the second guide elements are again formed by guide shoes or rail runner elements, preferably born by rolling bearings, whereby the latter interact with the guide rails 44a, 44b. The second guide elements 46—as is particularly obvious also from FIGS. 6 and 7—are arranged on an offset underside 48 of the second slide, said offset being configured to match the offset upper side 39 of the first slide 28. In particular, the underside 48 of the second slide 29 has a first horizontal surface 49a that is opposite the first horizontal plane 43a at a minimal distance, a second horizontal surface 49b that is at a minimal distance opposite the second horizontal plane 43b, and a central surface 49c connecting the two horizontal planes 49a, 49b with each other, said central surface being configured as the oblique surface corresponding to the course of the inclined plane 43c and extending at a minimal distance with respect thereto.

On the first horizontal surface 49a, there is arranged a first pair of the second guide elements 46a parallel to and at a distance from each other, corresponding to the distance of the guide rails 44a. On the second horizontal surface 49b, there is arranged a second pair 46b of the second guide elements 46 parallel to and at a distance from each other, corresponding to the distance of the guide rails 44b. Each of the second guide elements 46a, 46b extends across the entire width (in z-direction) of the first and the second horizontal surfaces 49a and 49b, respectively. As is obvious from FIGS. 3, 6 and 7, the width of the second horizontal surface 49b is clearly smaller than the width of the second horizontal surface 49b—which also applies to the length of the first pair of the second guide elements 46a, compared to the second pair 46b.

Furthermore referring to FIGS. 3, 6 and 7, it is obvious that the second slide or cross slide 29 here is constructed so as to be integral with the carrier 9 for the processing unit 7. The carrier 9 is a column 50 that has a rectangular, open front side that—during use—faces the work space 3, substantially triangular sides 52, 53, a substantially rectangular opening on the rear side 54 and an offset underside, said underside forming the underside 48 of the second slide 29. The openings or holes in the front side 51, the rear side 54 and in the sides 52, 53 (here only the openings in the left side 52 in FIG. 6 being indicated) reduce the weight of the column 50 and thus the weight moved during operation, which can advantageously save driving energy and wear. The rear side 54 is oriented obliquely with respect to the vertical plane in order to be able to dissipate well any forces acting on the processing spindle 11—while a workpiece 12 is being processed—through the column 50 and the compound slide 27 to the machine bed 6.

On the front side 51, the column 50 bears vertical guides 56 that are formed by two guide rails 56a, 56b that extend at a distance from and parallel to each other in vertical direction y. Here, the guide rails 56a, 56b extend over the entire height of the front side 51. The guide rails 56a, 56b are in operative connection with the guide elements 57 that are arranged in the form of guide shoes or rail runner elements 57a, 57b on the third slide 31 at a distance from each other, corresponding to the distance of the guide rails 56a, 56b. For moving the third slide 31 along the guides 56 in the vertical direction y, motors 58 are provided on the column 50, said motors being obvious, in particular, in FIGS. 2 and 6.

The third slide that can be moved via the guide elements 57 on the guide rails 56a, 56b in vertical direction and thus can be referred to as the vertical slide carries the processing spindle 11. In particular, the processing spindle 11 may be a milling spindle. However, it may also be any other suitable tool spindle, a laser head or the like. In the present embodiment, the milling spindle 7 preferably comprises an additional pivot axis A about a horizontal axis that extends essentially parallel to the first horizontal direction x, as well as a pivot axis C perpendicular thereto. Another pivot axis B perpendicular to the pivot axis A may also be provided. The processing spindle 11 could also have no additional rotating and pivot axes, other than the processing axis.

To explain the operating principle of the positioning device 26 described so far, additional reference is made to FIGS. 8a and 8b that show side views of the positioning device 26 with the machine bed 6, the compound slide 27 and the carrier 9 during a positioning operation. During the positioning operation, the processing spindle 9 is positioned relative to a workpiece 12—not specifically shown here—in order to process said workpiece. Positioning may also take place at the same time as processing of the workpiece 12. The positioning device 26 functions as follows:

It is assumed that the workpiece 12 is in the vertical processing position as depicted by FIGS. 1 to 3. Furthermore, it is assumed that the processing spindle 11 is in the position depicted in FIGS. 1 to 3, in which the processing spindle 11 is arranged at least in the second horizontal direction z the farthest from the workpiece 12. This state is also shown by FIG. 8a. For processing the workpiece 12, the processing spindle 11 can be moved in the two horizontal directions x, z and in the vertical direction y, into the respective processing position in accordance with specifications.

For moving in the first horizontal direction or in longitudinal direction x, the motor 36 is moved in a guided manner by a here not specifically shown control device, in particular a CNC control, in the longitudinal direction x on the longitudinal guides 8 of the machine bed 6. During the movement in longitudinal direction x, the compound slide 27, in particular the first slide or the longitudinal slide 28, is guided in the guide rails 8a, 8b and 8c at a constant guiding distance in a stiff and stable manner, so that high movement dynamics with high movement rates in longitudinal direction x are made possible. Due to the offset form of the first and the second slides 28, 29 and the embodiment of the carrier 9 provided with openings and holes, the moved mass is advantageously reduced, which additionally promotes high movement dynamics.

At the same time or after the movement in longitudinal direction x, the processing unit 7 can also be moved in the second horizontal direction or transverse direction z toward the workpiece 12 (delivery movement). To do so, the at least one motor 47 for the second slide or the cross slide 29 is suitably activated in order to move the cross slide 29 accordingly. In doing so, the cross slide 29 is guided in the transverse guides 44 in a precise manner. For this purpose, in particular the first pair 46*a* of the second guide elements, e.g., the rail runner elements, are in engagement or operative connection with the guide rail pair 44*a*, while the second pair 46*b* of the second guide elements 46 of the cross slide 29 is in engagement or operative connection with the second pair 44*b* of guide rails on the longitudinal slide 28.

The essentially outermost guiding point, at which the first pairs of guide rails and guide elements 44*a*, 46*a* are in engagement with each other, is marked 61 in FIG. 8*a*, while the second essentially outermost guiding point at which the second pairs of guide rails and guide elements 44*b*, 46*b* are in engagement with each other, is marked 62. The distance between the first and the second guiding points 61, 62 is to be referred to as the guiding distance 63 (in transverse direction z).

As can be inferred from FIGS. 8*a* and 8*b*, the guiding distance 63 increases while the second slide of the compound slide 27 is moved relative to the first slide 28 in the first horizontal direction or transverse direction z toward the workpiece 12. The increasing guiding distance 63 increases guiding stability and guiding accuracy.

In the processing position shown in FIG. 8*b*, the guiding distance 63 is the greatest, which also results in the greatest stability, stiffness and guiding accuracy. As a result of this, it is possible to achieve a high positioning accuracy that also results in high processing quality and thus high-quality work outcome.

At the same time or after the movement in longitudinal direction x and transverse direction z, the processing unit 7 can also be moved in the vertical direction y. To do so, the motors 58 are suitably activated to drive the third slide 31 in vertical direction y. During the corresponding vertical traversing motion, the third slide 31 is guided precisely in the vertical guides 56.

During the positioning in all three directions x, y and z, there is always provided stable, stiff and accurate guiding, in which case the stability and the stiffness in the processing position is advantageously additionally increased. The setup of the positioning device 26 is very simple, compact, structurally stiff and cost-effective. It requires only a small footprint, in which case the base side 32 of the machine bed 6 may be reduced. The positioning device 26 allows a large guiding and working range, with a compound slide 27 that projects only minimally beyond the machine bed 6. Furthermore, the optimized form of the column 50, the openings provided therein and the offset configuration of the two slides 28, 29 of the compound slide 27 ensure a reduction of the moved mass and thus increase movement dynamics. The form promotes short and effective force dissipation paths of the forces acting on the processing spindle 11 while the workpiece 12 is being processed.

Numerous modifications are possible within the framework of the invention. While the invention is illustrated herein in conjunction with a processing center 1 that is suitable for processing large parts, the processing center may also be designed as a smaller individual processing machine. Furthermore, while a horizontal processing center is illustrated and described herein, the positioning device 26 can also be used for positioning a tool in a vertical processing center or a vertical processing machine. Alternatively or additionally, the positioning device 26 can also be used for positioning the workpiece in the processing position. Moreover, while in the illustrated embodiment the machine bed 6 is shown with an offset upper side 33, this configuration is not absolutely necessary, so that the upper side 33 of the machine bed 6 may also be configured to be flat. It is important that the compound slide 27—in particular the first and the second slides 28, 29—have a corresponding offset configuration that also allows the corresponding arrangement of the guides and the guide elements 44, 46 in order to be able to increase the guiding distance 63 during delivery movements of the tool (or the workpieces) and thus the stiffness, stability and guiding accuracy. The offset configuration of the machine bed 6, however, additionally ensures a reduction of the moved mass, better stiffness, including torsional stiffness of the construction, as well as a good support and the dissipation of forces during processing.

There is provided a positioning device 26, in particular a tool positioning device, for a processing center 1 that comprises a compound slide 27 with a first slide 28 that can be moved in a longitudinal direction x of the processing center 1 and a second slide 29 that can be moved in transverse direction z relative to the first slide 28. The first and the second slides 28, 29 have a matching offset configuration of the sides 39, 48 opposite each other, that bear guides 44 and guide elements 46 that interact with each other in order to guide the second slide 29 in transverse direction z. These guides 44 and guide elements 46 are in part arranged at different heights in a vertical direction y in such a manner that the second slide 29 is guided on the first slide 28 on at least two spaced apart guiding points 61, 62, wherein the guiding distance 63 between the guiding points 61, 62 varies during a traversing motion of the second slide 29 relative to the first slide 28 in transverse direction z. In particular, the guiding distance 63 can be enlarged during a delivery operation of the positioning device in order to increase stiffness and guiding stability for processing. Furthermore, there is provided a processing center 1, in particular a horizontal processing center, with such a positioning device 26.

What is claimed is:

1. A positioning device, including a tool positioning device; for a processing center (1), the processing center (1) including a processing station (2) including a processing unit (7) movably supported on a machine bed (6), the processing unit (7) operatively supported and guided by first guides (8) along the machine bed (6), the positioning device comprising:
    a first slide (28) bearing first guide elements (42) that are arranged for the operative connection with the first guides (8) in order to movably guide the first slide (28) during operation in a first horizontal direction (x), wherein the first slide (28) bears second guides (44) that extend transversely to the first horizontal direction (x) during operation in a second horizontal direction (z),
    with a second slide (29) bearing second guide elements (46) for the operative connection with the second guides (44) of the first slide (28) in order to movably guide the second slide (29) on the first slide (28) during operation in the second horizontal direction (z),
    wherein the second guide elements (46) and the second guides (44) are each arranged in part at different heights in a vertical direction (y) that extends perpendicularly to the first and the second horizontal directions (x, z) in such a manner that the second slide (29) is guided on the first slide (28) on at least two guiding points (61, 62) that are separated from each other, their distance (63) varying relative to the first slide (28) during a traversing motion of the second slide (29).

2. The positioning device according to claim 1, characterized in that the first and the second slides (28, 29) form a compound slide (27) with which a workpiece (12) and/or a tool (7) can be motorically moved at least into the first and second horizontal directions (x, z), wherein the first and the second horizontal directions (x, z) are oriented perpendicularly to each other.

3. The positioning device according to claim 1, characterized in that the first slide (28) has an offset upper side (39) that has a first horizontal plane (43a) and a second horizontal plane (43b) that is arranged in vertical height direction (y) above the first horizontal plane (43a).

4. The positioning device according to claim 3, characterized in that the second guides (44) comprise at least a first pair of parallel guide rails (44a) extending on the first horizontal plane (43a) and at least one further pair of parallel guide rails (44b) extending on the second horizontal plane (43b).

5. The positioning device according to claim 3, characterized in that the first horizontal plane (43a) and the second horizontal plane (43b) are connected to each other by an oblique plane (43c) of the upper side (39) that extends in an inclined manner with respect to the first and the second horizontal directions (x, z) and the vertical direction (y).

6. The positioning device according to claim 4, characterized in that the second slide (29) has an offset underside (48) that matches the offset upper side (39) of the first slide (28) and has a first horizontal surface (49a) and a second horizontal surface (49b), wherein the first horizontal surface (49a) has at least a first pair of rail runner elements (46a) of the second guide elements (46) that are arranged and disposed for the operative connection with the first pair of guide rails (44a) of the first slide (28), wherein the second horizontal surface (49b) comprises at least one further pair of rail runner elements (46b) of the second guide elements (46) that are arranged and disposed for the operative connection with the further pair of guide rails (44b) of the first slide (28).

7. The positioning device according to claim 6, characterized in that the rail runner elements (46a, 46b) and the guide rails (44a, 44b) are arranged in such a manner that, during operation, a guiding distance (63) between a first guiding point (61), at which the first pair of rail runner elements (46a) is in engagement with the first pair of guide rails (44a), and a second guiding point (62), at which the further pair of rail runner elements (46b) is in engagement with the further pair of guide rails (44b), varies, while the second slide (29) is being moved relative to the first slide (28) in the second horizontal direction (z).

8. The positioning device according to claim 6, characterized in that the first horizontal plane (43a) and the guide rails (44a) thereon have a greater dimension in the second horizontal direction (z) than the second horizontal plane (43b) and have the second guide rails (44b) thereon, and that the first horizontal surface (49a) and the rail runner elements (46a) thereon have a smaller dimension in the second horizontal direction (z) than the second horizontal surface (49c) and the rail runner elements (46b) thereon.

9. The positioning device according to claim 1, characterized in that the first slide (28) further has an offset underside (38) with planes (41a-c) parallel to the planes (43a-c) of the upper side (39).

10. The positioning device according to claim 1, characterized in that it is disposed for positioning the processing unit (7) in the processing center (1), the processing center (1) including a horizontal processing center, wherein the second slide (29) bears a carrier (9) for the processing unit (7), the processing unit (7) including a milling unit.

11. A processing center for processing workpieces, comprising large parts in tool making, mold making and model making, or in the production in the automobile industry or the aircraft industry, comprising:

a processing station (2) that bears a processing unit (7) for processing a workpiece (12); and the positioning device (26) according to claim 1 that is arranged for positioning the workpiece (12) and the processing unit (7) relative to each other, wherein the first and the second slides (28, 29) are associated with driving devices (36, 47) in order to motorically move said slides in the first and second horizontal directions (x, z), respectively, along the first and second guides (8, 44), respectively.

12. The processing center according to claim 11 that forms a horizontal processing center (1) in which the processing unit (7) is held in a substantially horizontal position on a carrier (9) and workpieces (12) are loaded on a workpiece palette (19) in horizontal position and are processed in vertical position, and that further comprises a setup station (14) for mounting workpieces (12) on a workpiece palette (19) and/or a buffer station (16) for the temporary intermediate storage of a workpiece palette (19) with a workpiece (12) mounted thereon, workpiece positioning means (21, 22) arranged to transfer a workpiece palette (19) with the workpiece (12) during a transport between one of the setup station (14), the buffer station (16) and the processing station (2) and another of the stations (14, 16, 2) from a horizontal position into a vertical position or vice versa, wherein the positioning device (26) is disposed for positioning the processing unit (7) relative to the workpiece (12).

13. The processing center according to claim 11, characterized in that the processing unit (7) comprises a processing spindle (11) including a milling spindle, and that the processing spindle (11) has additional rotating, pivoting and/or processing axles (A, B, C).

14. The processing center according to claim 11, characterized in that it comprises a machine bed (6) whose longitudinal extension defines a longitudinal direction that extends parallel to the first horizontal direction (x), wherein the first slide (28) of the positioning device (26) is movably supported and guided on the machine bed (6) in longitudinal direction (x).

15. The processing center according to claim 14, characterized in that the machine bed (6) has an upper bearing surface (34) that bears machine bed guide rails (8a-c) extending in longitudinal direction (x), on which guides the first slide (28) is guided so as to be movable in the first horizontal direction (x).

16. The processing center according to claim 15, characterized in that that the upper bearing surface (34) of the machine bed (6) has an offset configuration with a first horizontal bearing surface section (34a) at a first vertical height, said first horizontal bearing surface section bearing at least one or more machine bed guide rails (8a), and a second horizontal bearing surface section (34b) at a second vertical height, said second horizontal bearing surface section bearing at least one additional of the machine bed guide rails (8b), wherein the first and the second horizontal bearing surface sections (34a, 34b) are connected with each other by an obliquely extending central surface section (34c).

17. The processing center according to claim 11, characterized in that the processing unit (7) includes a carrier (9) including the second slide (29) as an integral part of the carrier (9), wherein the carrier (9) further comprises vertically oriented guides (56) on which a vertical slide (31) including a vertical slide bearing is supported and guided so as to be motorically movable in the vertical direction (y).

* * * * *